United States Patent
Frailong et al.

(10) Patent No.: US 7,924,860 B1
(45) Date of Patent: Apr. 12, 2011

(54) MAINTAINING DATA UNIT ORDER IN A NETWORK SWITCHING DEVICE

(75) Inventors: Jean-Marc Frailong, Los Altos, CA (US); Sharada Yeluri, San Jose, CA (US); Anurag P. Gupta, Saratoga, CA (US); Jeffrey G. Libby, Cupertino, CA (US); Edwin Su, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 175 days.

(21) Appl. No.: 12/343,318

(22) Filed: Dec. 23, 2008

(51) Int. Cl.
*H04L 12/56* (2006.01)
(52) U.S. Cl. ......... 370/413; 370/428
(58) Field of Classification Search .......... 370/230, 370/230.1, 231, 235, 400, 401, 412, 413, 370/428
See application file for complete search history.

(56) References Cited

U.S. PATENT DOCUMENTS

| | | | | |
|---|---|---|---|---|
| 7,227,842 B1* | 6/2007 | Ji et al. | | 370/235 |
| 2002/0122424 A1* | 9/2002 | Kawarai et al. | | 370/394 |
| 2003/0161303 A1* | 8/2003 | Mehrvar et al. | | 370/386 |
| 2004/0111489 A1* | 6/2004 | Yamaguchi | | 709/217 |
| 2006/0146708 A1* | 7/2006 | Kanazawa | | 370/232 |
| 2008/0259928 A1* | 10/2008 | Chen et al. | | 370/394 |

* cited by examiner

*Primary Examiner* — Pankaj Kumar
*Assistant Examiner* — Duc T Duong
(74) *Attorney, Agent, or Firm* — Harrity & Harrity, LLP (57) ABSTRACT

Data units received by a network device may be classified into traffic flow classes in which the determined traffic flow class for a data unit may be dynamically refined as the data unit is processed by the network device. A dispatch component of the network device may receive data units associated with traffic flow classes. Parallel processing engines of the network device may receive the data units from the dispatch component and may generate, for a least one of the data units, a plurality of dynamically refined indications of the traffic flow class to which the data unit belongs. Additionally, an ordering component of the network device may include a plurality of re-order queues, where the at least one data unit successively progresses through at least two of the re-order queues in an order defined by the plurality of dynamically refined indications of the traffic flow class.

22 Claims, 7 Drawing Sheets

MAINTAINING DATA UNIT ORDER IN A NETWORK SWITCHING DEVICE

BACKGROUND

Computing and communication networks typically include devices, such as routers, switches or gateways, which transfer or switch data, such as packets, from one or more sources to one or more destinations. A packet is one form of data in which encapsulated data can be transmitted through a network based on control information that is stored in a header portion of the packet. A router is a switching device that can receive a packet and, based on the packet header, may forward the packet towards its final destination.

Existing routers include forwarding engines for receiving and forwarding incoming packets to their intended destinations. To forward incoming packets from an input port of the router to an appropriate output port, routers may perform data manipulation actions on the packet header. These data manipulation actions may be performed by a number of packet processing engines that may operate in parallel on a number of packets.

Packets received by a router may be received at one or more input ports and transmitted from the router through one or more output ports. Packets may belong to data traffic flows. The protocol requirements of the network may require that packets in the same traffic flow be transmitted from the router in the same order that they are received by the router. In other words, for certain traffic flows, it is undesirable for the router to reorder packets within the traffic flow. Packets from a same flow, however, may be transmitted to different ones of the parallel packet processing engines. Because the packet processing engines may have different throughputs, without a mechanism to maintain packet order, packets in a same flow may be undesirably reordered during processing by the packet processing engines.

SUMMARY

In accordance with one implementation, a network device may include a dispatch component that receives data units associated with traffic flow classes; a plurality of parallel processing engines that receives the data units from the dispatch component and that generates, for a least one of the data units, a plurality of dynamically refined indications of the traffic flow class to which the data unit belongs; and an ordering component that includes a plurality of re-order queues, the at least one data unit successively progressing through at least two of the re-order queues in an order defined by the plurality of dynamically refined indications of the traffic flow class.

In accordance with another implementation, a method may maintain order for data units processed by a network device. The method may include receiving a data unit at the network device and dispatching the data unit to one of a plurality of parallel processing engines that generates a plurality of successive classifications for the data unit, each classification relating to a traffic flow to which the data unit belongs. The method may further include progressing the data unit through a series of re-order queues determined based on the plurality of successive classifications for the data unit.

In accordance with still another implementation, an ordering component in a router may include a plurality of input queues that receives data units incoming to the router, each data unit being enqueued into an input queue selected based on a physical interface at which the data unit is received by the router. The ordering component may additionally include re-order queues that receive data units from outputs of the input queues or from outputs from the plurality of re-order queues and a switch that connects the outputs of the plurality of input queues to inputs of the plurality of re-order queues and outputs of the plurality of re-order queues to inputs of the plurality of re-order queues. The ordering component may also include a control component that dequeues data units from the plurality of input queues and the plurality of re-order queues when a data unit is at the head of a queue and a command has been received for the data unit.

BRIEF DESCRIPTION OF THE DRAWINGS

The accompanying drawings, which are incorporated in and constitute a part of this specification, illustrate one or more embodiments described herein and, together with the description, explain the implementations described herein. In the drawings.

DETAILED DESCRIPTION

The following detailed description refers to the accompanying drawings. The same reference numbers may be used in different drawings to identify the same or similar elements. Also, the following detailed description does not limit the invention.

Data units received by a network device may be processed by a number of processing engines that operate in parallel. The data units may be classified into traffic flow classes, in which, for certain classes, data units within a class are maintained in the order in which the data units were received by the network device. The class for a particular data unit may be dynamically refined as the data unit is processed by the network device. Dynamically refining the class for a data unit allows data units to be separated by class based on the most recently calculated information that is known about the data unit. By spreading the data units into different classes as soon as possible, inefficiencies caused by a data unit from a first class stalling the processing of a later received data unit from another class can be reduced. This can allow for a relatively high level of processing engine utilization.

In the following description, the term "data unit" will be generally used to refer to a unit of data that is transmitted over a network or through a network device in the network. Depending on the network protocols used, a data unit may be, for example, a packet of data, a data frame, or other quantities of either fixed or variable width data.

Exemplary Network Device

Figure 1:
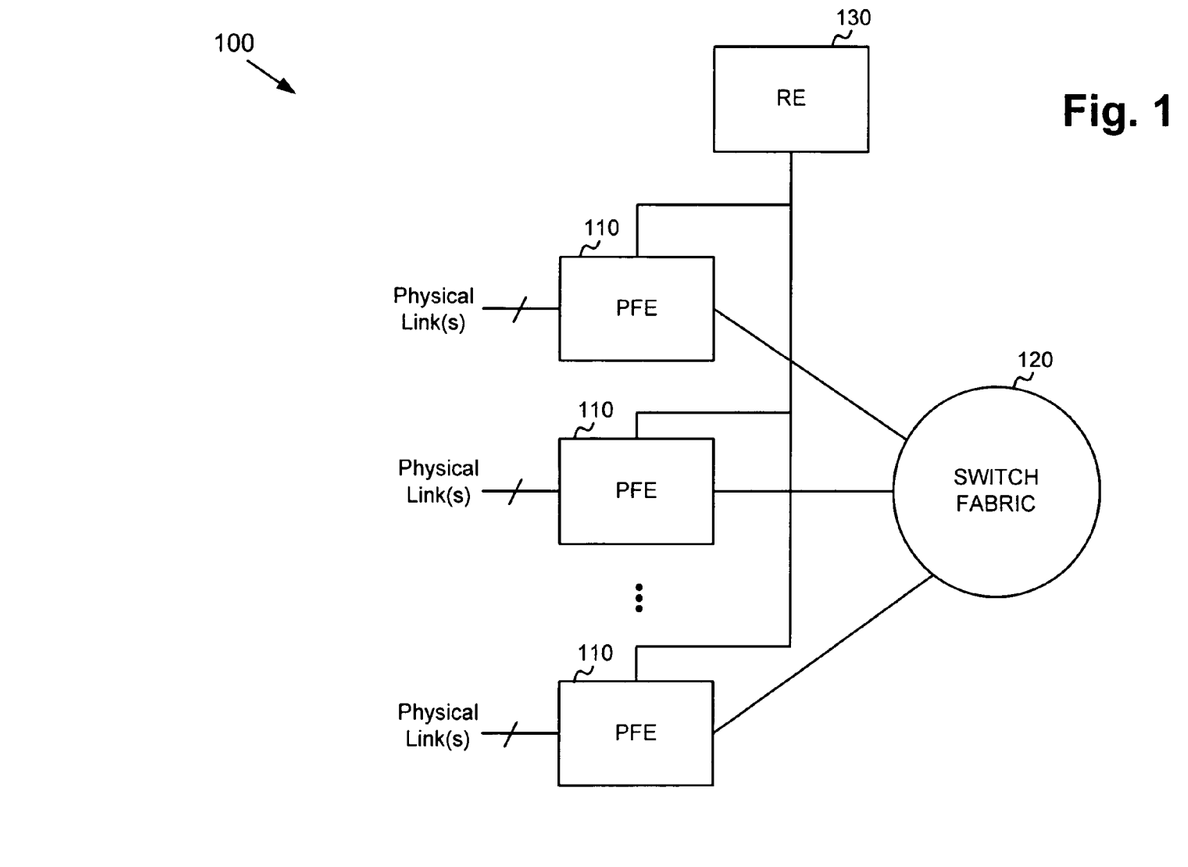
FIG. 1 is a block diagram illustrating an exemplary network device for forwarding data units in a network.

FIG. 1 is a block diagram illustrating an exemplary network device 100 for forwarding data units in a network. Network device 100 may be, for example, a router or switch in a network. Network device 100 may receive data streams from physical links, process the data streams to determine destination information, and transmit the data streams out on links in accordance with the destination information. As shown in FIG. 1, network device 100 may include packet forwarding engines (PFEs) 110, a switch fabric 120, and a routing engine (RE) 130.

PFEs 110 may each be connected to RE 130 and switch fabric 120. PFEs 110 may receive data units at ports on physical links connected to a network, such as a wide area network (WAN) or a local area network (LAN). Each physical link could be one of many types of transport media, such as optical fiber or Ethernet cable. The data on the physical link may be formatted according to one of several protocols, such as the synchronous optical network (SONET) standard or Ethernet.

PFEs 110 may, for each received data unit, process a header of the data unit to determine an appropriate output port for the data unit. PFEs 110 may modify the header of the received data units before transmitting the data unit to the determined output port. Some received data units may be forwarded to an output port connected to the PFE at which the data unit arrived. Other data units may be forwarded, via switch fabric 120, to other PFEs 110 in network device 100 for transmission at the determined output port.

Switch fabric 120 may be a switching component designed to allow efficient communication between PFEs 110. For instance, switch fabric 120 may be a hardwired non-blocking minimal spanning switch capable of connecting N inputs to N outputs in any combination.

RE 130 may perform high level management functions for network device 100. For example, RE 130 may communicate with other networks and network devices connected to network device 100 to exchange information regarding network topology. RE 130 may create routing tables based on network topology information and forwarding tables based on the routing tables. The forwarding tables may be used by PFEs 110 to perform route lookup for incoming data units. RE 130 may also perform other general control and monitoring functions for network device 100.

Network device 100 may operate to keep data units from certain traffic flows (also referred to as "classes" herein) in order as the data units traverse network device 100. The class for a particular data unit may be dynamically refined as the data unit is processed by the network device 100. A "traffic flow," as used herein, may refer to a sequence of data units from a particular physical or logical source (e.g., a computer host, process, or class of service) or between a pair of source and destination devices. In general, data units from different traffic flows may become intermingled as the data units traverse a network. Data units from different flows may be handled differently be network device 100. For instance, with some flows, maintaining data unit order may not be required while other flows may require that data units in the flow are received and transmitted by network device 100 in the same order.

Network device 100 illustrates one possible implementation of a device, such as a router, that may maintain orderings for data units in a traffic flow. In other implementations, network switching devices with other architectures or designs could also be used to maintain the order of data units in a traffic flow, as described herein. In general, the term "router," as used herein, means either a switch or a router.

Data Unit Ordering

Figure 2:
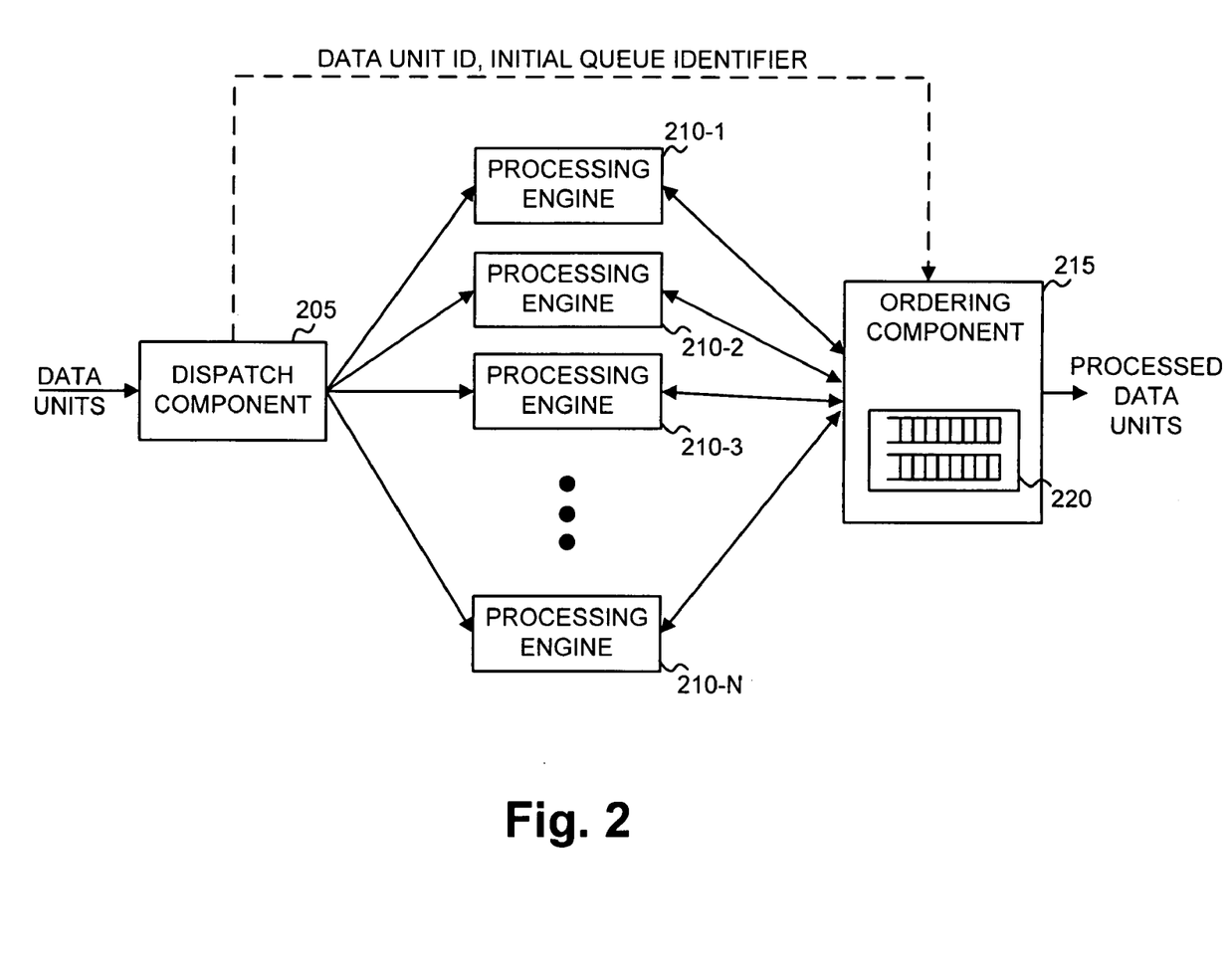
FIG. 2 is a diagram conceptually illustrating exemplary components of a network device related to processing and ordering of data units.

FIG. 2 is a diagram conceptually illustrating exemplary components of network device 100 related to processing and ordering of data units. As shown, a dispatch component 205 may receive data units and may transmit the data units to a number of processing engines 210-1 through 210-N (collectively referred to as processing engines 210). Dispatch unit 205 may control the sending of data units to processing engines 210 in a manner that attempts to balance the load on processing engines 210.

Processing engines 210 may operate on the data units to determine an output port for the data units and potentially rewrite portions of the headers of the data units. Processing engines 210 may be implemented in parallel and may operate independently of one another. Ordering component 215 may assist in controlling the egress of data units from processing engines 210 so that, when required, data units in a traffic flow stay in order.

Although processing engines 210 are illustrated in FIG. 2 as receiving data units from dispatch component 205, in some implementations, processing engines 210 may not receive complete data units. For instance, the header of each data unit may be stripped from the payload portion of the data unit, and the header, or a link to the header, may be sent to processing engine 210 while the payload portion of the data unit is stored in another memory (not shown in FIG. 2). After processing, the payload and header portion of the data unit may be reunited before being transmitted at an output port of network device 100.

Further, the components shown in FIG. 2 may correspond to a conceptual illustration of the operation of network device 100 in ordering and processing data units. For instance, in the context of the physical implementation shown in FIG. 1, multiple processing engines 210 may be located in each PFE 110. Dispatch component 205 and ordering component 215 may be implemented in each PFE 110, implemented in a distributed manner across PFEs 110, or centrally implanted in another portion of network device 110.

Additionally, each processing engine 210, although labeled as an "engine," is not necessarily limited to implementations in which each processing engine 210 is a discrete physical component. For example, in one implementation, each PFE 110 may contain multiple physical processing engines, which each further may implement multiple software processing threads that each operate on data units. For clarity herein, processing engines 210 will be described as multiple independently operating units that receive and process input data units. Processing engines 210 may be implemented in hardware, implemented in software, or implemented as a combination of hardware and software. Further, processing engines 210 do not necessarily need to each be identical to one another. For example, some of processing engines 210 may be implemented solely in hardware while others may be implemented in software. Further, processing engines 210 may be physically distributed, such as by being located on different PFEs 110.

As is further shown in FIG. 2, ordering component 215 may include or be associated with ordering queues 220. Ordering queues 220 may be used to keep data units ordered as the data units traverse processing engines 210. Dispatch component 205 and processing engines 210 may both communicate with ordering queues 220 to control the progression of data units through ordering queues 220. For instance, and as described in more detail below, dispatch component 205 may add a received data unit to a specific queue in ordering queues 220 and processing engines 210 may control the flow of data units through ordering queues 220 based on the progressive refinement of the traffic flow class corresponding to the data unit being processed by the particular processing engine.

Figure 3:
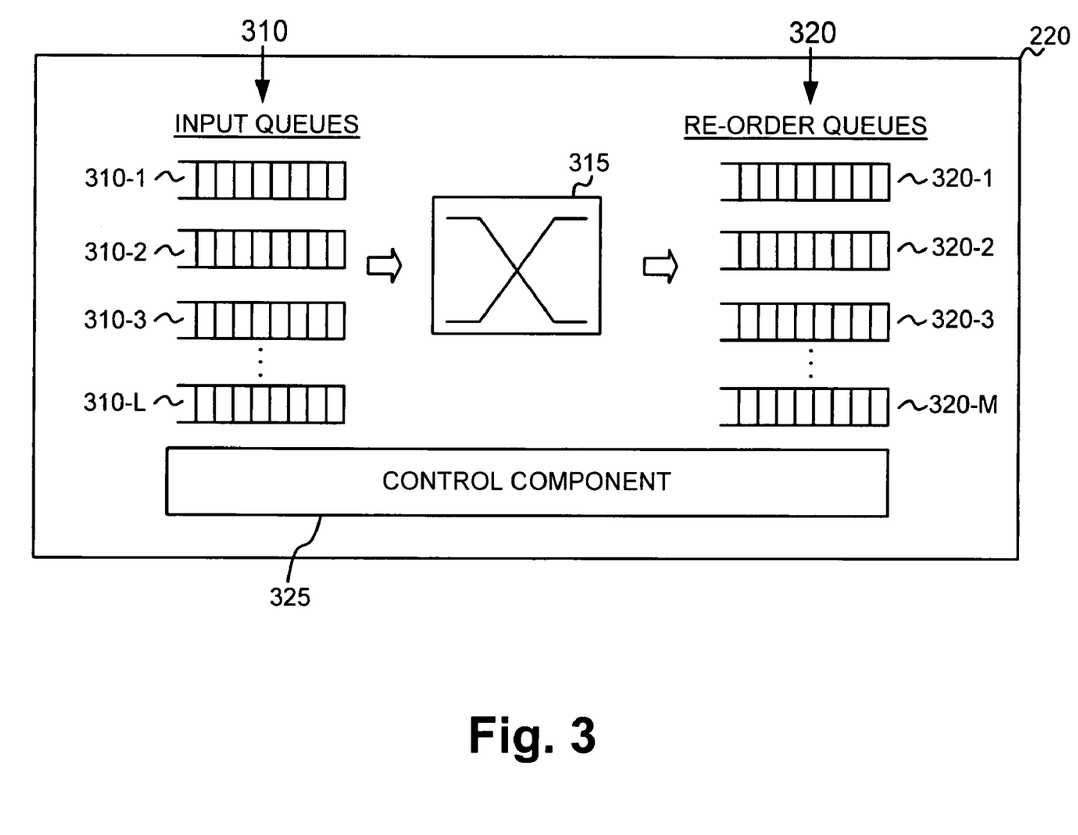
FIG. 3 is a diagram illustrating an exemplary implementation of ordering queues in the network device.

FIG. 3 is a diagram illustrating, in additional detail, an exemplary implementation of ordering queues 220. Ordering queues 220 may include input queues 310-1 through 310-L (collectively, input queues 310), switch 315, re-order queues 320-1 through 320-M (collectively re-order queues 320), and control component 325. Input queues 310 and re-order queues 320 may together implement a two level first-in-first-out (FIFO) queue structure. In general, data units may be initially placed in one of input queues 310 before being placed into one of re-order queues 320. The data unit may progress through multiple ones of re-order queues 320 until processing of the data unit is complete.

In one implementation, the number of input queues 310 may be based on the number of physical links (e.g., ports) in network device 100. For example, there may be approximately one input queue 310 per physical link. The number of re-order queues 320 to use may be bound by the number of processing engines 210 and may generally be determined based on the number of expected traffic flows and on empirical observations that attempt to optimize the tradeoff of performance versus re-order queue complexity and expense. Too few re-order queues 320 may result in too many different traffic classes being assigned to the same queue, potentially resulting in the processing of one class slowing the processing of another class.

Switch 315 may connect input queues 310 and re-order queues 320. Switch 315 may be implemented as, for example, a cross-bar switch that connects the output of any input queue 310 or re-order queue 320 to the input of any re-order queue 320.

Control component 325 may control the operation of input queues 310, switch 315, and re-order queues 320. Control component 325 may be implemented as, for example, software, hardware, or a combination of software and hardware. Control component 325 may generally scan the heads of queues 310 and 320 and may act on data units at the head of these queues. Control component 315 may also communicate with dispatch component 205 and process engine 210 to, for example, receive commands (described in more detail below) related to input queues 310 and re-order queues 320.

Figure 4:
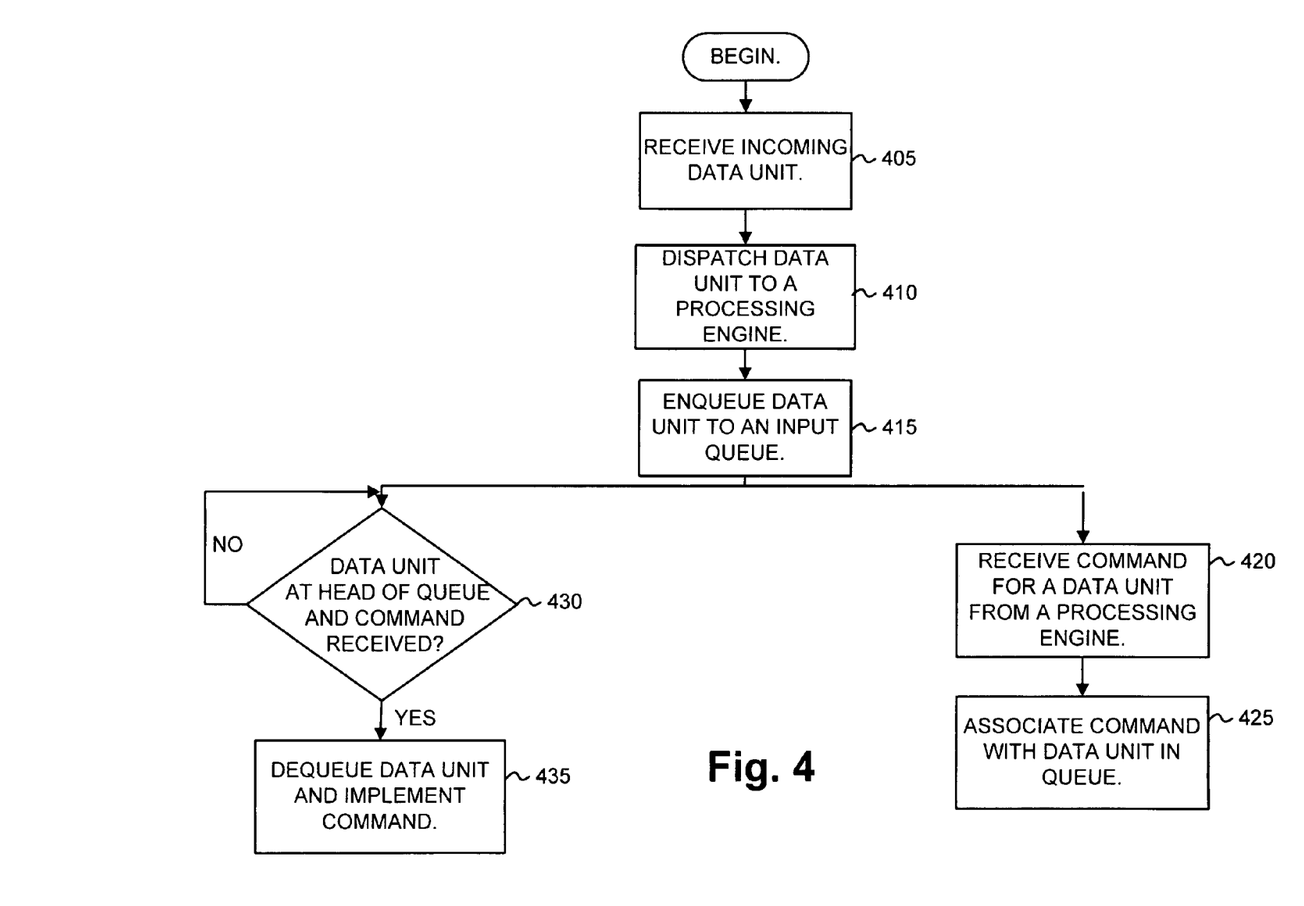
FIG. 4 is a flow chart illustrating exemplary operations for maintaining data unit order in the network device.

FIG. 4 is a flow chart illustrating exemplary operations for maintaining data unit order in network device 100. Initially, a data unit may be received by network device 100 (block 405). For instance, the data unit may be received as part of a particular traffic flow on a physical link of one of PFEs 110.

The received data unit may progress through network device 100 to dispatch component 205. Dispatch component 410 may transmit the data unit to one of processing engines 210 (block 410). Dispatch component 410 may generally operate to dispatch the incoming data units to processing engines 210 in a load balanced manner. For example, dispatch component 410 may transmit the data unit to processing engines 210 in a round-robin manner.

Although dispatch component 205 was discussed in the previous paragraph as transmitting the "data unit," in some implementations, the payload portion of a received data unit may be initially separated and stored in memory by network device 100. Subsequent processing by dispatch component 205, processing engines 210, and ordering component 215 may be performed using the header (or other control information) portion of the data unit. For clarity of explanation, dispatch component 205, processing engines 210, and ordering component 215 may be described herein as transmitting, receiving, or otherwise operating on a data unit. It can be appreciated that in this context, "data unit" may refer to less than the entire data unit (e.g., only the header portion or only an identifier relating to the data unit).

Dispatch component 205 may also enqueue the received data unit to one of input queues 310 (block 415). For example, dispatch component 205 may transmit an identifier of the data unit and an indication for an initial input queue 310 for the data unit to ordering component 215.

Dispatch component 205 may determine the input queue 310 for the data unit based on the physical link (e.g., based on a hash of a value corresponding to the physical link). In general, dispatch component 205 may determine the input queue 310 for the data unit based on information other than the contents of the data unit. In this manner, dispatch unit can quickly and efficiently assign each incoming data unit to an appropriate input queue 310 without necessarily having to substantively examine the contents of the data unit.

In other implementations, assigning an incoming data unit to an input queue 310 may be performed by a component other than dispatch component 205. For example, dispatch component 205 may transmit a physical link identifier to control component 325, which may then determine the input queue for the data unit based on the physical link identifier.

Once received at an input queue 310 of ordering component 215, a data unit may progress through its input queues 310 and re-order queues 320 until processing of the data unit has completed. This progression of a data unit through ordering component 215 is illustrated in FIG. 4 as blocks 420, 425, 430, and 435. The functions embodied by blocks 420 and 425 may be performed in parallel with the functions embodied by blocks 430 and 435.

Ordering component 215 may receive commands from processing engines 210 relating to the processing of the data units (block 420). In one implementation, the set of possible commands may include: (1) a "next queue" command that indicates the next re-order queue 320 for the data unit, and (2) a "finish" command that indicates that processing of the data unit is complete.

Each received command may be associated with the data unit to which the command applies. Commands may be received for data units that are not at the head of a queue (block 425). In this case, the command may be associated with the data unit in its queue and may progress with the data unit as it moves through the queues.

Control component 325 of ordering component 215 may, in blocks 430 and 435, process data units in input queues 310 and re-order queues 320. More specifically, control component 325 may determine when a data unit reaches the head of a queue and has a command to process (block 430). Control component 425 may then dequeue the data unit and implement the command (block 435). For example, if the command is a "next queue" command, the data unit may be moved to a re-order queue indicated by the command. If the command is a "finish" command, processing of the data unit may be finished, and the data unit may be sent to an output port for transmission from network device 100.

Figure 5:
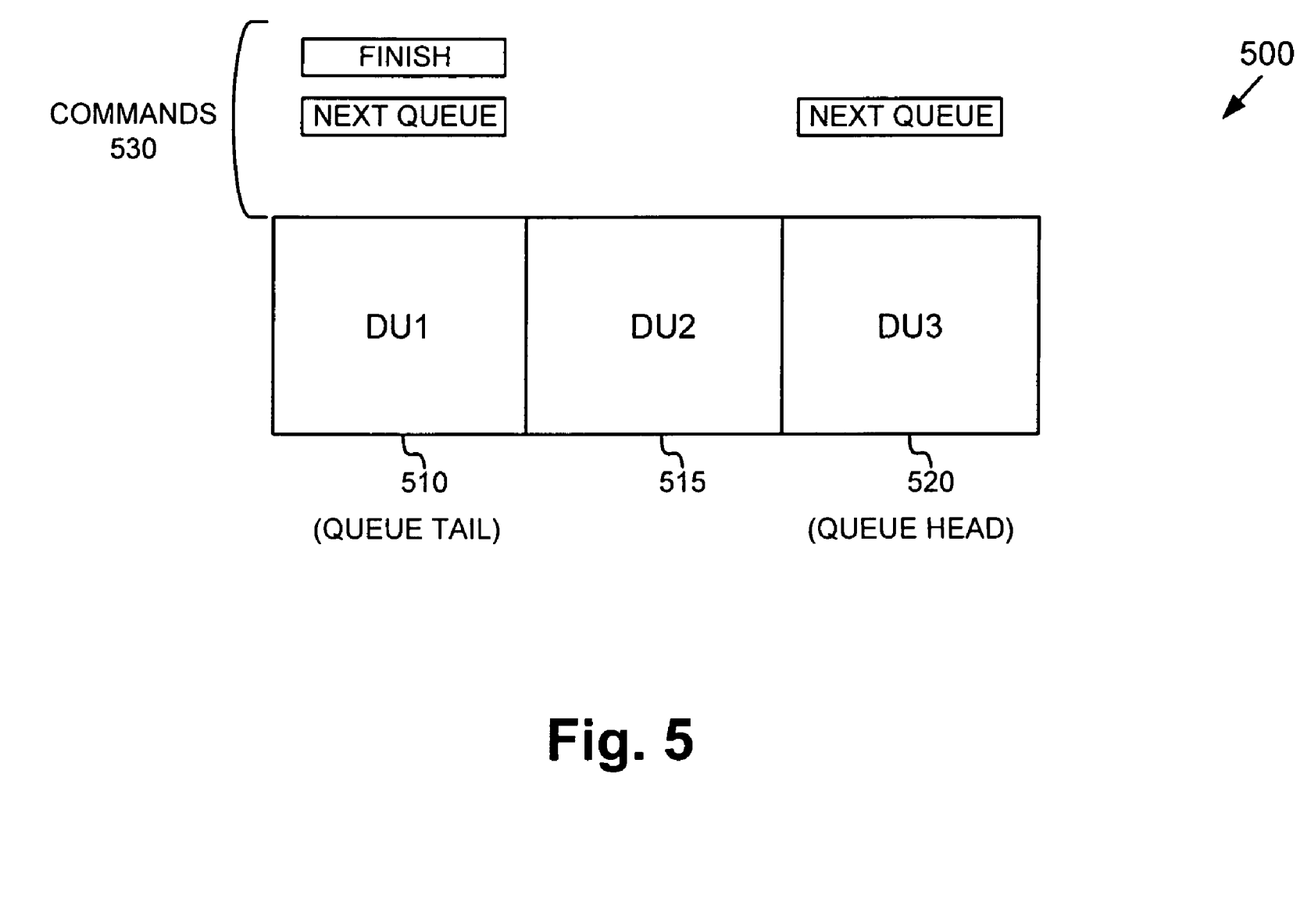
FIG. 5 is a diagram illustrating an exemplary queue and corresponding data units and commands.

The operations of blocks 420, 425, 430, and 435 will be further discussed by way of example with respect to FIG. 5. FIG. 5 is a diagram illustrating an exemplary queue 500, such as one of re-order queues 310, and corresponding data units and commands. As shown, queue 500 may include a three element FIFO queue having entries 510, 515, and 520. Assume entry 510 is a tail (the most recently received data unit) of queue 500 and entry 520 is a head (the next data unit to be dequeued) of queue 500. Entry 510 may store the data unit labeled "DU1," entry 515 may store the data unit labeled "DU2," and entry 520 may store the data unit labeled "DU3." Commands 530 may represent commands received for data units DU1, DU2, and DU3. For example, for DU3, the command "next queue" has been received, indicating the next re-order queue that DU3 should be queued into. When dequeued from queue 500, DU3 may be sent to the tail of the re-order queue indicated by this command. Command DU2 is not associated with a command. DU2 will not be dequeued from queue 500 until a command is received for DU2.

Data unit DU1 may be associated with two commands, a "next queue" command and a "finish" command. In other words, two commands have been received for DU1 and have not yet been processed. Ordering component 215 may allow multiple commands to be "stacked" in this manner. In some implementations, the number of commands that may be stacked for a data unit may be limited to a predetermined number, such as a maximum of two "next queue" commands and one "finish" command. When DU1 reaches the head of queue 500 and is dequeued, it may be moved to re-order queue 320 specified by its "next queue" command. In this next queue, the "finish" command may continue to be associated with DU1.

In some implementations, commands in addition to the "next queue" and "finish" commands may be used. For instance, a command may be defined in which a processing engine can request to be alerted when a particular data unit progresses to the head of its current queue. This type of command can be used by network device 100 to perform in-order processing when desired. For example, it may be desired to mark each data unit in a traffic flow class with a serial number that increases sequentially over the class. With a command to alert a processing unit 210 that a data unit is at the head of a queue, the processing unit can be assured that the data unit is the next data unit in the traffic flow to reach the head of the queue.

Figure 6:
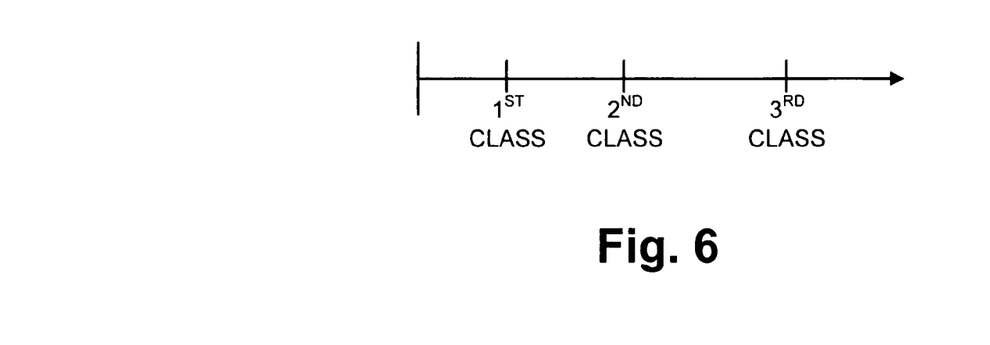
FIG. 6 is a time line illustrating refinement of a traffic flow class for an exemplary data unit as the data unit is processed by a processing engine.

FIG. 6 is a time line illustrating refinement of the traffic flow class for an exemplary data unit as the data unit is processed by processing engine 210. The class assigned to a data unit may be progressively refined by the processing engine to which the data unit is assigned. As shown in FIG. 6, for example, a data unit may be progressively classified into a number of classes, labeled as "$1^{st}$ class," "$2^{nd}$ class," and "$3^{rd}$ class." In one implementation, classes may be identified based on a hash of a particular portion of a data unit header.

As an example of how classes (e.g., "$1^{st}$ class," "$2^{nd}$ class," "$3^{rd}$ class") may be generated, assume that the data unit includes a number of progressively encapsulated protocols, such as a data unit that includes a payload originally sent as an IPv4 (Internet Protocol, version 4) packet that is encapsulated as Ethernet and then further encapsulated as a second Ethernet encapsulation. As processing engine 210 proceeds in processing the header of the data unit, it may obtain progressively better knowledge of the final class for the data unit. In this example, "class 1" may be generated based on the second Ethernet information, "class 2" may be generated based on the first Ethernet information, and "class 3" may be generated based on the IPv4 header information in the data unit. In this manner, processing engine 210 may be able to progressively determine better classifications of the final traffic class for the data unit. After each class determination, processing engine 210 may notify ordering component via a "next queue" command.

Figure 7:
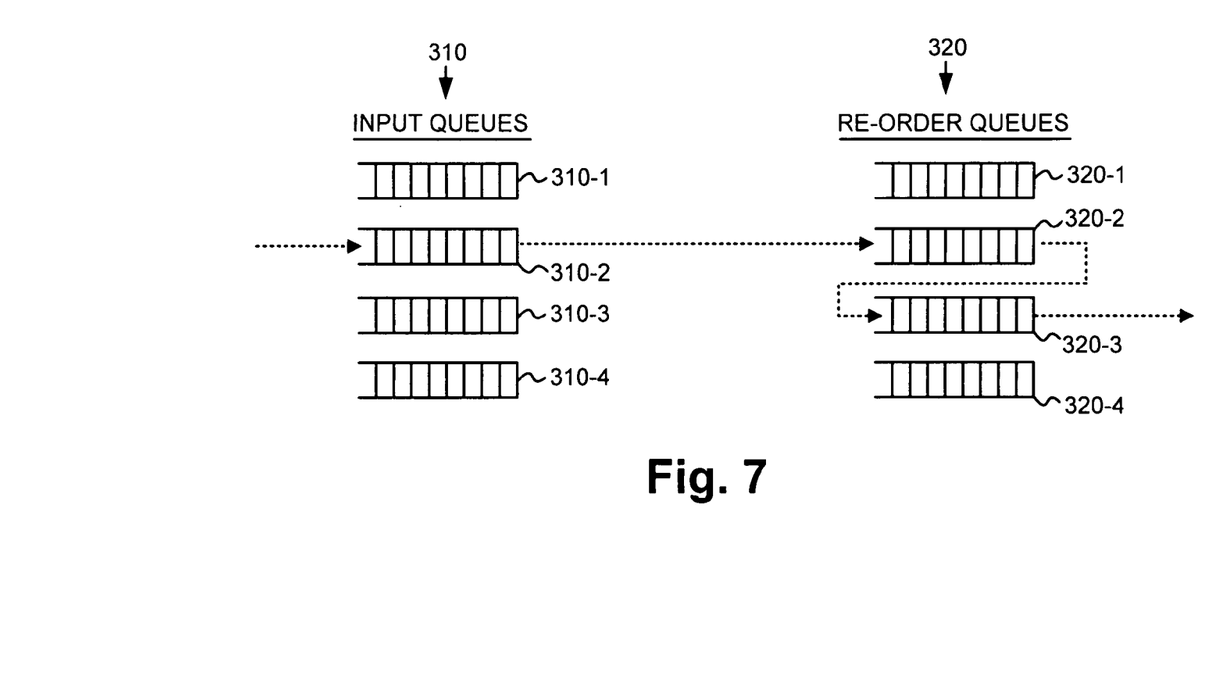
FIG. 7 is a diagram conceptually illustrating the progression of an exemplary data unit through input queues and re-order queues.

FIG. 7 is a diagram conceptually illustrating the progression of an exemplary data unit through input queues 310 and re-order queues 320. In this example, assume that, based on a data unit's input port, dispatch component 205 assigns the data unit to input queue 310-2. Assume that when the data unit reaches the head of queue 310-2 it has a "next queue" command associated with it, where the command specifies re-order queue 320-2. The data unit may then be assigned to re-order queue 320-2 and may progress through this queue. Assume that when the data unit reaches the head of queue 320-2 it has another "next queue" command associated with it, where the command specifies re-order queue 320-3. The data unit may then be assigned to re-order queue 330-2 and may progress through this queue. Finally, assume that when the data unit finishes progressing though re-order queue 320-3, it has a "finish" command associated with it. Processing of the data unit may be complete. Control component 325 may thus dequeue the data unit and may forward the data unit on it way to transmission on an output port.

In the example of FIG. 7, a data unit from a traffic flow may be assigned to a series of re-order queues 320 as the processing engine processes the data unit. Because the assignments of the re-order queues for a data unit may be based on a deterministic function (e.g., a hash function applied to header information) of the header information of the data unit, data units from the same traffic flow may be assigned the same "series" of queues by the processing engines. In other words, successive data units from the same traffic flow may follow each other through the queues while data units from other traffic flows may be assigned to other queues. In this manner, data units from the same traffic flow will stay in order and may not block data units from other traffic flows.

Figure 8:
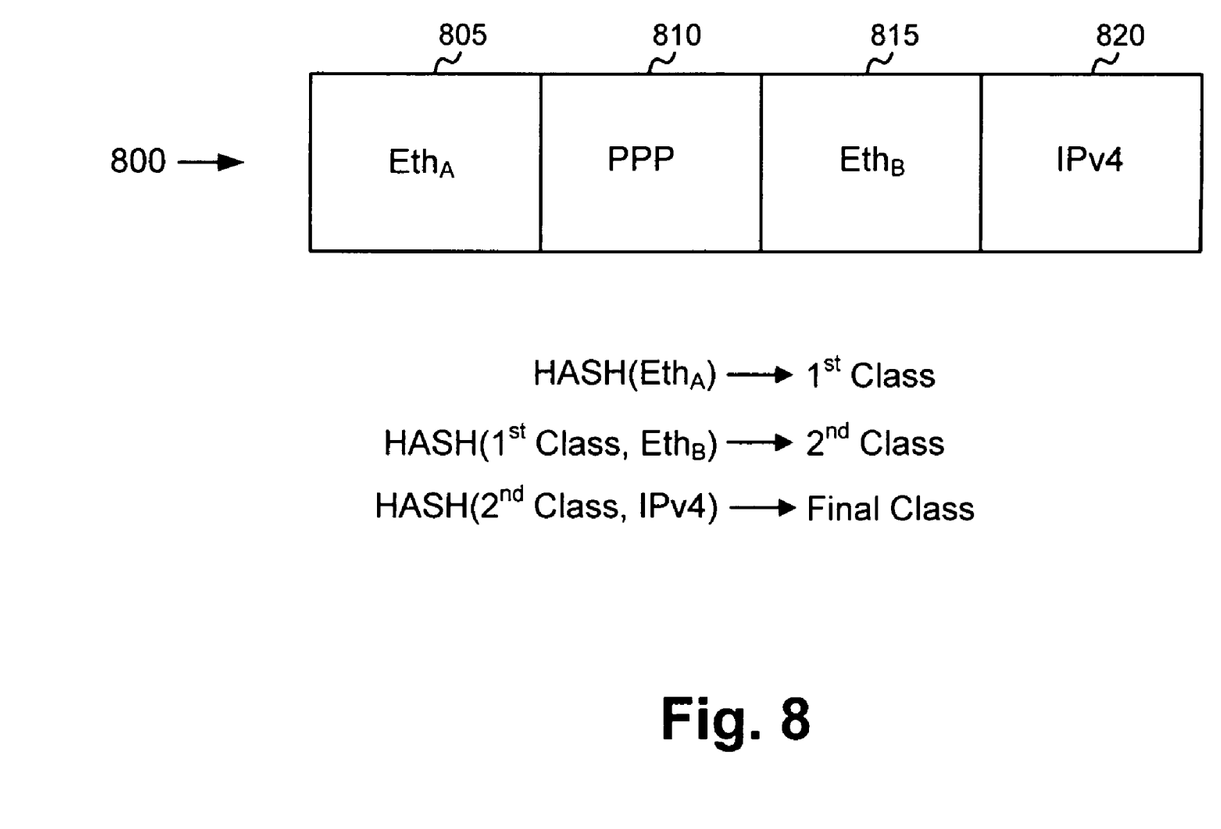
FIG. 8 is diagram illustrating the refinement of traffic classes for an exemplary data unit.

FIG. 8 is a diagram illustrating refinement of traffic classes for an exemplary data unit. In this example, assume the data unit is a packet that includes a number of encapsulated routing protocols. More particularly, as shown in FIG. 8, a packet header 800 may includes a first Ethernet header portion 805 ($Eth_A$), a PPP (Point-to-Point Protocol) header portion 810, a second Ethernet header portion 815 ($Eth_B$), and an IPv4 portion 820. This packet may represent, for example, a packet sent by a home user transmitting a packet through a cable modem. In this case, the original packet sent by the user's computer may include a final destination defined by the IPv4 portion 820 (e.g., the IP address of a web server with which the user is communicating). The packet may be encapsulated as Ethernet portion 815 for transmission to the user's cable modem, where it may be further encapsulated using PPP portion 810 for authentication with a cable head-end. The packet may again be encapsulated using Ethernet portion 815 for transmission to the cable head-end.

In this example, the final address used by network device 100 may be the IPv4 portion 820. It may, however, take some time for a processing engine 210, such as processing engine 210-1, to process packet header 800 to obtain IPv4 portion 820. In the mean time, however, network device 100 may obtain useful information relating to the routing of the packet as it successively de-encapsulates header portions 805, 810, and 815. Network device may de-encapsulate Ethernet header portion 805 ($Eth_A$) and may use this information as the basis for an initial class determination. For example, network device 100 may hash Ethernet header portion 805 to obtain a hash value used to identify the first classification ($1^{st}$ class) for the packet. Processing engine 210-1 may send this first class to ordering component 215 as part of a "next queue" command. Processing engine 210-1 may de-encapsulate PPP header portion 810. PPP header portion 810 may include no useful information for purposes of traffic classification, and may not be used to refine the packet's classification. Processing engine 210-1 may de-encapsulate Ethernet header portion

815 (Eth$_B$) and may use this information as the basis for another class determination. For example, processing engine 210-1 may obtain a hash value based on the previous class and based on Ethernet header portion 815. This hash value may define the second classification (2$^{nd}$ class) for the packet. Processing engine 210-1 may send this second class to ordering component 215 as part of a "next queue" command.

A number of techniques may be used to associate the hash values with re-order queues 320. For instance, a content-addressable-memory (CAM) or a direct mapped memory could be used to associate the class hash values with re-order queues 320.

Finally, processing engine 210-1 may de-encapsulate IPv4 header portion 820 and may use this information as the basis for another class determination. For example, processing engine 210-1 may obtain a hash value based on the previous class and based on IPv4 header portion 820. This hash value may define the final classification (final class) for the packet. Processing engine 210-1 may send this final class to ordering component 215 as part of a "next queue" command. At some point, processing engine 210-1 may finish processing packet header 800, and may send a "finished" command to ordering component 215. In this manner, processing engine 210-1 may determine a number of progressively refined classifications for the input packet.

CONCLUSION

The foregoing description of embodiments described herein provides illustration and description, but is not intended to be exhaustive or to limit the embodiments described herein to the precise form disclosed. Modifications and variations are possible in light of the above teachings or may be acquired from practice of the invention. For example, while a series of blocks has been described in FIG. 4, the order of the blocks may vary in other implementations. Also, non-dependent blocks may be performed in parallel.

Even though particular combinations of features are recited in the claims and/or disclosed in the specification, these combinations are not intended to limit the invention. In fact, many of these features may be combined in ways not specifically recited in the claims and/or disclosed in the specification.

Further, certain portions of the invention may be implemented as "logic" or as a "component" that performs one or more functions. This logic or component may include hardware, such as an application specific integrated circuit or a field programmable gate array, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise. The scope of the invention is defined by the claims and their equivalents.

Furthermore, aspects described herein may be implemented in many different forms of network topologies, software, firmware, and hardware in the implementations illustrated in the figures. The actual software code or specialized control hardware used to implement aspects consistent with the principles described herein is not limiting of the invention. Thus, the operation and behavior of the aspects were described without reference to the specific software code—it being understood that one of ordinary skill in the art would be able to design software and control hardware to implement the aspects based on the description herein.

What is claimed:

1. A network device comprising:
    a dispatch processor that receives data units associated with traffic flow classes;
    a plurality of parallel processors that receive the data units from the dispatch processor and generate, for at least one of the data units, a plurality of dynamically refined indications of the traffic flow class to which the at least one of the data unit belongs; and
    an ordering processor including:
        a plurality of re-order queues, the at least one data unit successively progressing through at least two of the plurality of re-order queues in an order defined by the plurality of dynamically refined indications of the traffic flow class; and where the ordering processor additionally includes:
        a plurality of input queues having outputs connected to inputs of the plurality of re-order queues, each of the data units being initially enqueued to one of the plurality of input queues based on information other than a content of each the data units.
        where each of the data units is initially enqueued to an input queue determined based on an input port at which the data unit is received by the network device.

2. The network device of claim 1, where the plurality of parallel processors communicate with the ordering processor using commands that include:
    a command that specifies a next one of the re-order queues to which the at least one data unit should be enqueued; and
    a command that indicates that processing of the at least one data unit is complete.

3. The network device of claim 2, where the plurality of parallel processors communicate with the ordering component using commands that additionally include:
    a command requesting that a parallel processors be notified when a particular data unit progresses to the head of a re-order queue.

4. The network device of claim 1, where the data units comprise packets and the network device comprises a router.

5. The network device of claim 1, where the plurality of parallel processors operate independently of one another.

6. The network device of claim 1, where the dispatch processor dispatches the received data units to the plurality of parallel processors in a load-balanced manner.

7. The network device of claim 1, where the ordering processor is further to:
    to control movement of data units through the plurality of re-order queues, including dequeueing a first data unit from a first re-order queue when the first data unit has reached a head of the first re-order queue and the first data unit is associated with a command received from one of the plurality of parallel processors.

8. The network device of claim 7, where the control processor is further to store multiple unexecuted commands for the first data unit.

9. A method of maintaining order for data units processed by a network device, the method comprising:
    receiving a data unit at the network device;
    dispatching the data unit to one of a plurality of parallel processors that generates a plurality of successive classifications for the data unit, each classification relating to a traffic flow to which the data unit belongs;

progressing the data unit through a series of re-order queues determined based on the plurality of successive classifications for the data unit; and signaling, by the one of the plurality of parallel processors, for each successive classification, a re-order queue to which the data unit is to progress.

10. The method of claim 9, further comprising:
enqueueing the data unit to an input queue determined based on a physical interface at which the data unit is received by the network device, an output of the input queue connecting to inputs of the re-order queues.

11. The method of claim 9, where the plurality of parallel processors operate independently of one another.

12. A method of maintaining order for data units processed by a network device, the method comprising:
receiving a data unit at the network device;
dispatching the data unit to one of a plurality of parallel processors that generates a plurality of successive classifications for the data unit, each classification relating to a traffic flow to which the data unit belongs; and
progressing the data unit through a series of re-order queues determined based on the plurality of successive classifications for the data unit,
where progressing the data unit through the series of re-order queues further includes:
dequeueing the data unit from one of the re-order queues when the data unit is at the head of the one of the re-order queues and a command has been received for the data unit from one of the plurality of parallel processors.

13. The method of claim 12, where the command specifies a next one the re-order queues in the series of re-order queues.

14. The method of claim 12, where the command indicates that processing of the data unit is complete.

15. The method of claim 12, further comprising:
enqueueing the data unit to an input queue determined based on a physical interface at which the data unit is received by the network device, an output of the input queue connecting to inputs of the re-order queues.

16. The method of claim 12, where the plurality of parallel processors operate independently of one another.

17. An ordering component in a router, comprising:
a plurality of input queues that receive data units incoming to the router, each data unit being enqueued into an input queue selected based on a physical interface at which the data unit is received by the router;
a plurality of re-order queues that receive data units from outputs of the input queues or from outputs from the plurality of re-order queues;
a switch that connects the outputs of the plurality of input queues to inputs of the plurality of re-order queues and outputs of the plurality of re-order queues to inputs of the plurality of re-order queues; and
a control component that dequeues data units from the plurality of input queues and the plurality of re-order queues when a data unit is at the head of a queue and a command has been received for the data unit.

18. The ordering component of claim 17, where the command for each data unit is generated by one of a plurality of parallel processing engines that processes the data units to determine network routing information for the data units.

19. The ordering component of claim 17, where the data units comprise packets.

20. The ordering component of claim 17, where the command indicates a next one of the plurality of re-order queues, each of the data units successively progressing through ones of the re-order queues in an order determined by dynamically refined indications of the traffic flow class for the data unit.

21. A method of maintaining order for data units processed by a network device, the method comprising:
receiving a data unit at the network device;
dispatching the data unit to one of a plurality of parallel processors that generates a plurality of successive classifications for the data unit, each classification relating to a traffic flow to which the data unit belongs;
progressing the data unit through a series of re-order queues determined based on the plurality of successive classifications for the data unit; and
enqueueing the data unit to an input queue determined based on a physical interface at which the data unit is received by the network device, an output of the input queue connecting to inputs of the re-order queues.

22. The method of claim 21, where the plurality of parallel processors operate independently of one another.

* * * * *

UNITED STATES PATENT AND TRADEMARK OFFICE
CERTIFICATE OF CORRECTION

| | | |
|---|---|---|
| PATENT NO. | : 7,924,860 B1 | |
| APPLICATION NO. | : 12/343318 | |
| DATED | : April 12, 2011 | |
| INVENTOR(S) | : Jean-Marc Frailong et al. | |

It is certified that error appears in the above-identified patent and that said Letters Patent is hereby corrected as shown below:

Column 10, claim 1, line 25, following the word "unit", insert --,--;

Column 10, claim 7, line 52, delete the word "to".

Signed and Sealed this

Thirty-first Day of May, 2011

David J. Kappos
*Director of the United States Patent and Trademark Office*